United States Patent
Stephenson et al.

(10) Patent No.: US 6,423,368 B1
(45) Date of Patent: Jul. 23, 2002

(54) METHOD FOR MAKING MATERIALS HAVING UNIFORM LIMITED COALESCENCE DOMAINS

(75) Inventors: Stanley W. Stephenson, Spencerport; John W. Boettcher, Webster; David J. Giacherio, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/478,683

(22) Filed: Jan. 6, 2000

(51) Int. Cl.$^7$ .................................................. B05D 5/12
(52) U.S. Cl. .................. 427/64; 427/163.3; 427/163.4; 427/372.2
(58) Field of Search .............................. 427/123, 163.3, 427/163.4, 372.2, 64

(56) References Cited

U.S. PATENT DOCUMENTS

| | | | |
|---|---|---|---|
| 2,932,629 A | * | 4/1960 | Wiley ........................ 260/91.5 |
| 3,697,297 A | | 10/1972 | Churchill et al. |
| 3,933,771 A | | 1/1976 | Eastman et al. |
| 4,324,932 A | | 4/1982 | Link et al. |
| 4,435,047 A | | 3/1984 | Fergason |
| 4,833,060 A | | 5/1989 | Nair et al. |
| 5,437,811 A | | 8/1995 | Doane et al. |
| 5,695,682 A | | 12/1997 | Doane et al. |

FOREIGN PATENT DOCUMENTS

WO    WO 97/04398    2/1997

* cited by examiner

Primary Examiner—Brian K. Talbot
(74) Attorney, Agent, or Firm—Raymond L. Owens

(57) ABSTRACT

A light-modulating, electrically responsive sheet including a substrate and an electrically conductive layer formed over the substrate. The sheet further includes, in an aqueous bath, an immiscible, field responsive light-modulating material along with a quantity of colloidal particles wherein the colloidal particles limit coalesced domain size and a binder; blending the constituents of the aqueous bath to form a dispersion of said field-responsive, light-modulating material below a coalescence size which sets to form limited coalescence domains having a uniform size; coating said material over the substrate; and drying said coated material to form a set of uniform domains so that such dispersion coalesces to form a set of uniform limited coalescence domains having a plurality of electrically responsive optical states.

17 Claims, 8 Drawing Sheets

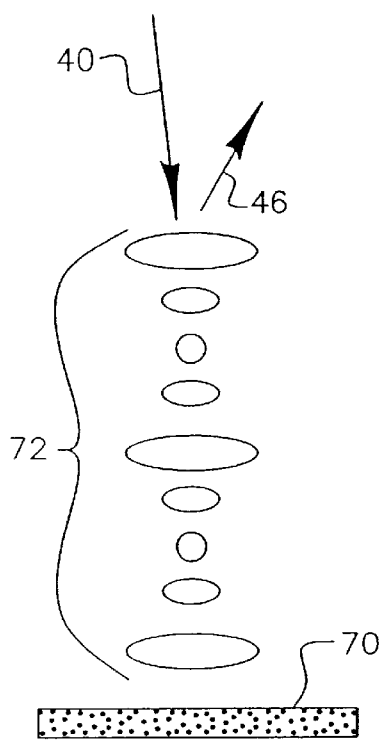 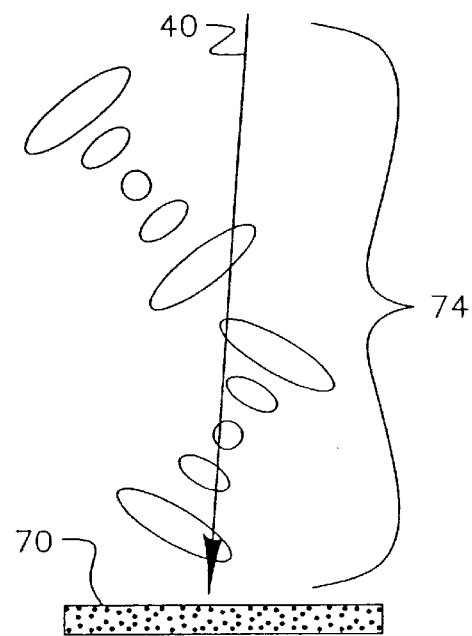
*FIG. 5A*  *FIG. 5B*
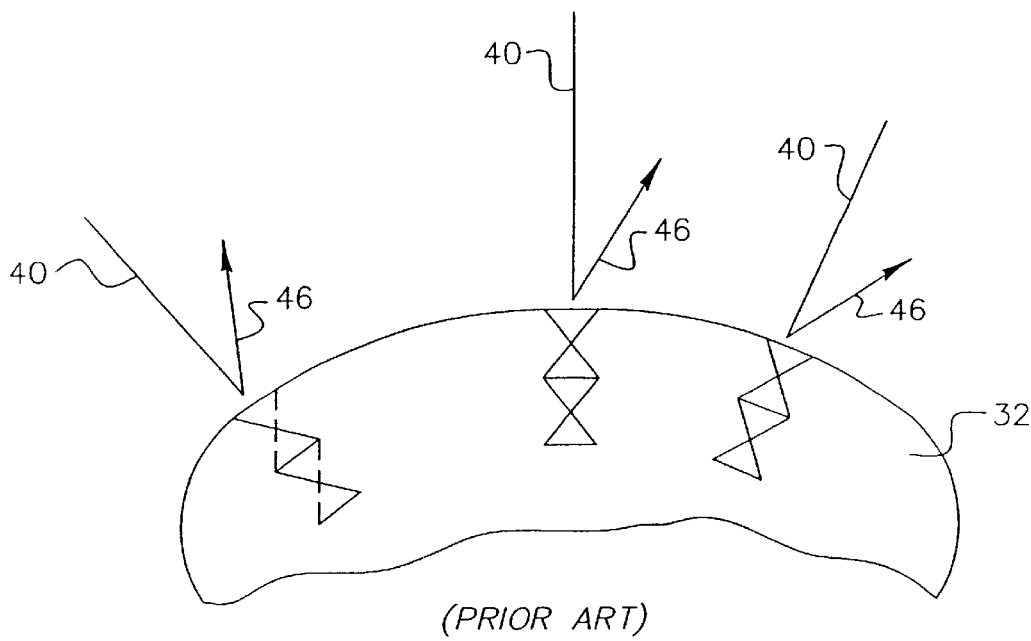
(PRIOR ART)
*FIG. 6*

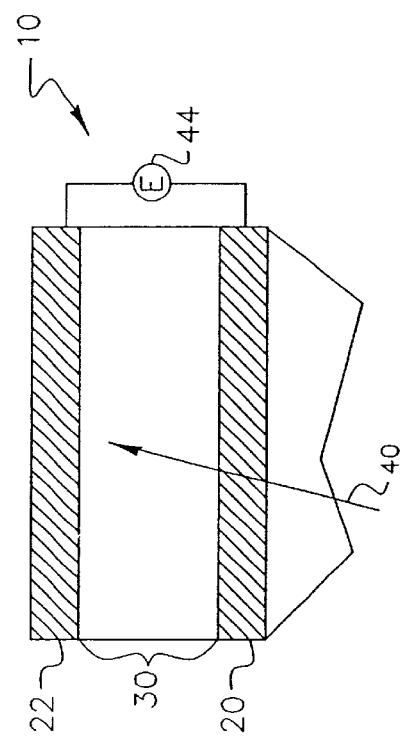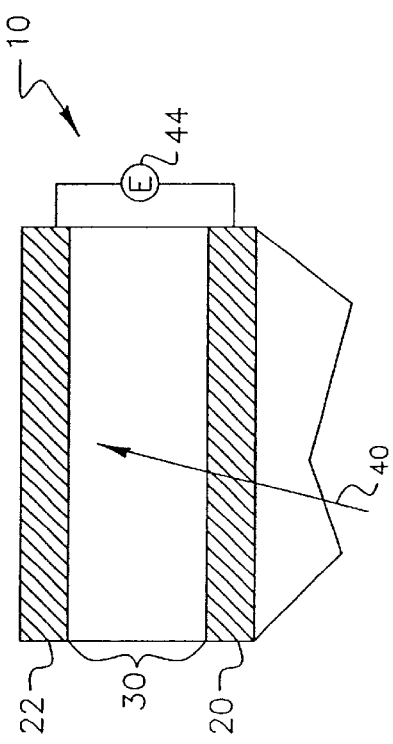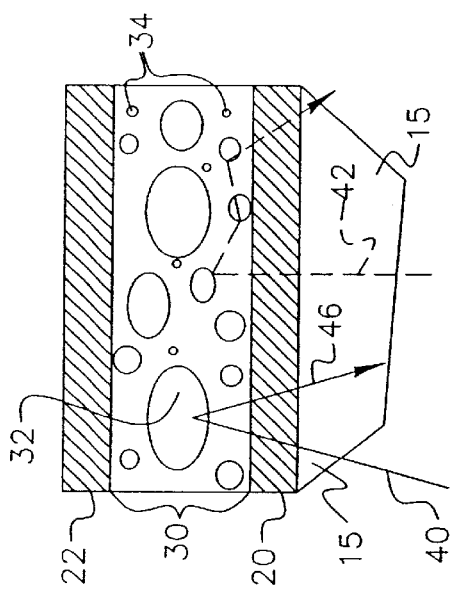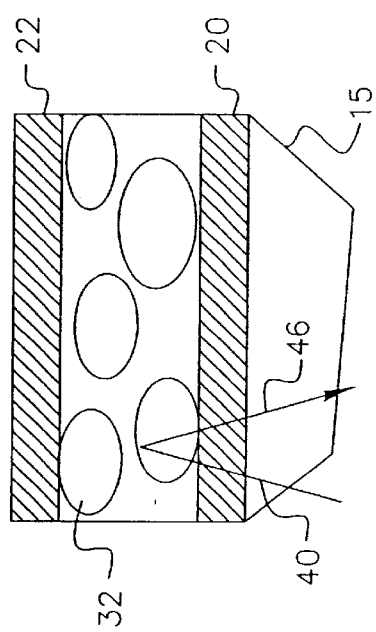

METHOD FOR MAKING MATERIALS HAVING UNIFORM LIMITED COALESCENCE DOMAINS

CROSS REFERENCE TO RELATED APPLICATIONS

Reference is made to commonly U.S. patent application Ser. No. 09/105,507 filed Jan. 26, 1998 now U.S. Pat. No. 6,010,339; Ser. No. 09/379,776 filed Aug. 24, 1999; Ser. No. 09/478,487 filed Jan. 6, 2000 entitled "Light-modulating, Electrically Responsive Privacy Screen" by Stanley W. Stephenson et al.; and Ser. No. 09/478,963 filed Jan. 6, 2000 entitled "Display Sheet Having Memory Using Limited Coalescence Domains" by Stanley W. Stephenson et al.; the disclosures of which are incorporated herein by reference.

FIELD OF THE INVENTION

The present invention relates to a method of making coatable sheets having light-modulating material.

BACKGROUND OF THE INVENTION

Currently, information is displayed on sheets using permanent inks or displayed on electronically modulated surfaces such as cathode ray displays or liquid crystal displays. Other sheet materials can carry magnetically writable areas to carry ticketing or financial information, however magnetically written data is not visible.

World patent application PCT/WO 97/04398, entitled "Electronic Book With Multiple Display Pages", is a thorough recitation of the art of thin, electronically written sheet display technologies. Disclosed is the assembling of multiple display sheets that are bound into a "book", each sheet provided with means to individually address each page. The patent recites prior art in forming thin, electronically written pages, including flexible sheets, image modulating material formed from a bi-stable liquid crystal system, and thin metallic conductor lines on each page.

Heretofore, U.S. Pat. No. 3,697,297, discloses material suitable for such a device. A cholesteric liquid crystal material is encapsulated by light penetrable gelatin and gum arabic capsules that are coated on a screen. The screen changes color when receiving sufficient heat energy to clear the cholesteric material.

Fabrication of flexible, electronically written display sheets using liquid crystals materials was disclosed in U.S. Pat. No. 4,435,047. A first sheet has transparent ITO conductive areas and a second sheet has electrically conductive inks printed on display areas. The sheets can be thin glass, but preferably have been formed of Mylar polyester. A dispersion of liquid crystal material in a binder is coated on the first sheet, and the second sheet is bonded to the liquid crystal material. Electrical potential is applied to opposing conductive areas to operate on the liquid crystal material and expose display areas. The display uses nematic liquid crystal materials, which ceases to present an image when de-energized. Currently, privacy windows are created using the scattering properties of conventional nematic liquid crystals. Such materials require continuous electrical drive to remain transparent.

U.S. Pat. No. 5,437,811 discloses a light-modulating cell having a polymerically dispersed chiral nematic liquid crystal. The chiral nematic liquid crystal has the property of being driven between a planar state reflecting a specific visible wavelength of light and a light scattering focal-conic state. Said structure has the capacity of maintaining one of the given states in the absence of an electric field.

The prior art discloses methods for forming polymer beads from polymeric precursors in aqueous suspension such as, U.S. Pat. No. 2,932,629. U.S. Pat. No. 2,932,629 disclose a limited coalescent method for forming spheroid particles of highly uniform size through the use of colloidal particles to limit coalescence of smaller droplets into larger, uniform domains. The polymerizable liquid is brought to given size, and a catalytic agent performs the polymerization reaction to form solid polymeric bodies having substantially uniform size. The technique of using limited coalescence for uniform bead size during polymerization is further disclosed in U.S. Pat. Nos. 3,933,771, 4,324,932, and 4,833,060.

SUMMARY OF THE INVENTION

Accordingly, it is an object of the present invention to provide a method of making a machine coatable polymerically dispersed light-modulating material of uniform domain size.

Another object of the present invention is to disperse liquid crystal material using limited coalesence and coat the dispersion to form a dispersed light-modulating layer having improved optical properties.

Sheets made in accordance with the present invention can be used to provide a re-writable image sheet. The present invention uses a colloidal solid particle emulsifier to limit domain growth from a highly dispersed state. Uniformly sized liquid crystal domains are created and machine coated to manufacture light-modulating, electrically responsive sheets with improved optical efficiency. The sheet can be formed using inexpensive, efficient photographic layer methods. A single large area of sheet material can be coated and formed into various types of sheets and cards. Displays in the form of sheets in accordance with the present invention are inexpensive, simple and fabricated using low-cost processes.

These objects are achieved by a method of making a light-modulating, electrically responsive sheet comprising:
(a) providing a substrate;
(b) forming an electrically conductive layer over the substrate;
(c) providing in an aqueous bath an immiscible, field responsive light-modulating material along with a quantity of colloidal particles wherein the colloidal particles limit coalesced domain size and a binder;
(d) blending the constituents of the aqueous bath to form a dispersion of said field-responsive, light-modulating material below a coalescence size which sets to form limited coalescence domains having a uniform size;
(e) coating said material over the substrate; and
(f) drying said coated material to form a set of uniform domains so that such dispersion coalesces to form a set of uniform limited coalescence domains having a plurality of electrically responsive optical states.

Flexible sheets can efficiently be made in accordance with the present invention that has a light-modulating layer that has domains with improved optical properties. By changing the field applied across the layer, information can be written in the sheet.

BRIEF DESCRIPTION OF THE DRAWINGS

FIG. 5A is a sectional view of a chiral nematic material in a planar state reflecting light;

FIG. 5B is a sectional view of a chiral nematic material in a focal-conic light transmitting state;

FIG. 6 is a sectional view of a conventional domain containing chiral nematic liquid crystal material;

FIG. 7A is a sectional view of a sheet having a layer of polymer dispersed cholesteric liquid crystal material using conventional dispersion methods;

FIG. 7B is a sectional view of the sheet of FIG. 7A with an applied electrical field;

FIG. 8A is a sectional view of a polymer dispersed limited coalescent cholesteric liquid crystal material;

FIG. 8B is a sectional view of material of FIG. 8A with an applied electrical field;

DETAILED DESCRIPTION OF THE PREFERRED EMBODIMENT

Figure 1A:
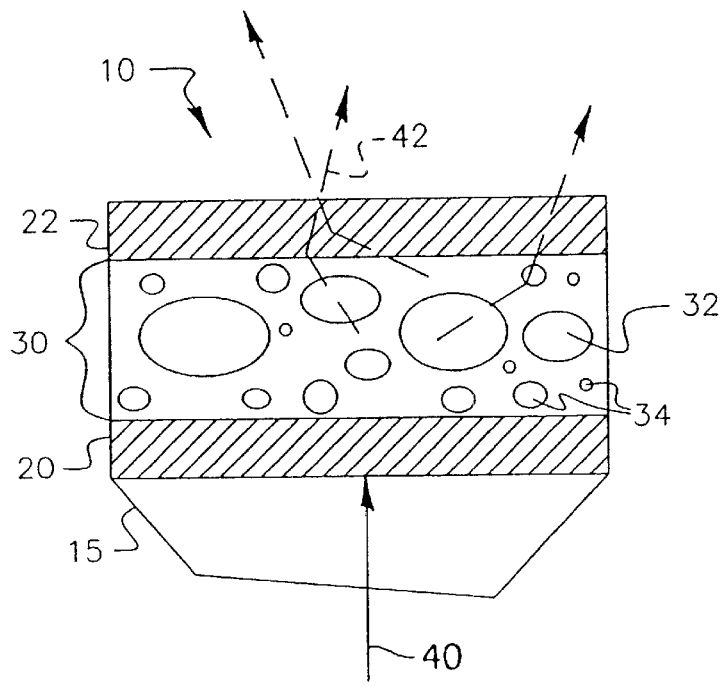
FIG. 1A is a sectional view of a prior art sheet having a layer of polymer dispersed liquid crystal material using current dispersion methods.

FIG. 1A is a sectional view of a portion of a sheet 10 supporting a conventional polymer dispersed light-modulating material. The sheet 10 includes a substrate 15. Substrate 15 can be made of a polymeric material, such as Kodak Estar film base formed of polyester plastic, and have a thickness of between 20 and 200 microns. For example, substrate 15 can be a 80 micron thick sheet of transparent polyester. Other polymers, such as transparent polycarbonate, can also be used. Alternatively, substrate 15 can be thin, transparent glass.

A first conductor 20 is formed over substrate 15. First conductor 20 can be a transparent, electrically conductive layer of tin-oxide or indium-tin-oxide (ITO), with ITO being the preferred material. Typically, first conductor 20 is sputtered onto the substrate 15 to a resistance of less than 250 ohms per square. Alternatively, first conductor 20 can be an opaque electrical conductor formed of metal such as copper, aluminum or nickel. If first conductor 20 is an opaque metal, the metal can be a metal oxide to create a light absorbing first conductor 20.

A light-modulating layer 30 is deposited over first conductor 20. Light-modulating layer 30 can contain a nematic liquid crystal of conventional design. The selected material should exhibit high optical and electrical anisotropy and match the index of refraction of the carrier polymer when the material is electrically oriented. This method will be described in more detail later. Examples of such materials are Merck BL-03, BL-048 or BL-033 which are available from EM Industries of Hawthorne, N.Y. Other light reflecting or diffusing modulating, electrically operated materials can also be coated such as a micro-encapsulated electrophoretic material in oil.

The liquid crystal can be a chiral doped nematic liquid crystal, also known as cholesteric liquid crystal, such as those disclosed in U.S. Pat. No. 5,695,682. Application of fields of various intensity and duration change the state of chiral doped nematic materials from a reflective to a transmissive state. These materials have the advantage of maintaining a given state indefinitely after the field is removed. Cholesteric liquid crystal materials can be Merck BL112, BL118 or BL126 that are available from EM Industries of Hawthorne, N.Y. The light-modulating layer 30 is effective in two conditions, which will be described in more detail below.

In one embodiment, a liquid crystal material is dispersed an aqueous bath containing a water-soluble binder material such as de-ionized gelatin, polyvinyl alcohol (PVA) or polyethylene oxide (PEO). Such compounds are machine coatable on equipment associated with photographic films. It is important that the binder have a low ionic content. The presence of ions in such a binder hinders the development of an electrical field across the dispersed liquid crystal material. Additionally, ions in the binder can migrate in the presence of an electrical field, chemically damaging the light-modulating layer 30. The liquid crystal and gelatin emulsion are coated to a thickness of between 5 and 30 microns to optimize optical properties of light-modulating layer 30. The coating thickness, size of the liquid crystal domains, and concentration of the domains of liquid crystal materials are designed for optimum optical properties. Heretofore, the dispersion of liquid crystals is performed using shear mills or other mechanical separating means to form domains 32 of liquid crystal within light-modulating layer 30.

A second conductor 22 is applied to the surface of light-modulating layer 30. Second conductor 22 should have sufficient conductivity to carry a field across light-modulating layer 30. Second conductor 22 can be formed in a vacuum environment using materials such as aluminum, tin, silver, platinum, carbon, tungsten, molybdenum, or indium. Oxides of said metals can be used to darken patternable conductive layer 14. The metal material can be excited by energy from resistance heating, cathodic arc, electron beam, sputtering or magnetron excitation. Use of tin-oxide or indium-tin oxide in the coating permit second conductor 22 to be transparent. Alternatively, second conductor 22 can be printed conductive ink such as Electrodag 423SS screen printable electrical conductive material from Acheson Corporation. Such printed materials are finely divided graphite particles in a thermoplastic resin.

In a series of experiments, EM Industries nematic liquid crystal material BL-048 was dispersed in deionized photographic gelatin by standard homogenization methods. By varying the formulation, homogenization devices (sonification and rotor-stator mixer) produce emulsions of different droplet size. Light microscopy showed the emulsions had very broad droplet size distribution, with domain size varying in diameter by a ratio of 10:1. Dispersions were made having mean sizes of approximately 1, 3, 5, and 9 micron diameter. The materials were coated onto sheets of ITO coated polyester having a sheet conductivity of 160 ohms per square. The coating was dried to provide a 9-micron thick polymerically dispersed liquid crystal coating.

Figure 1B:
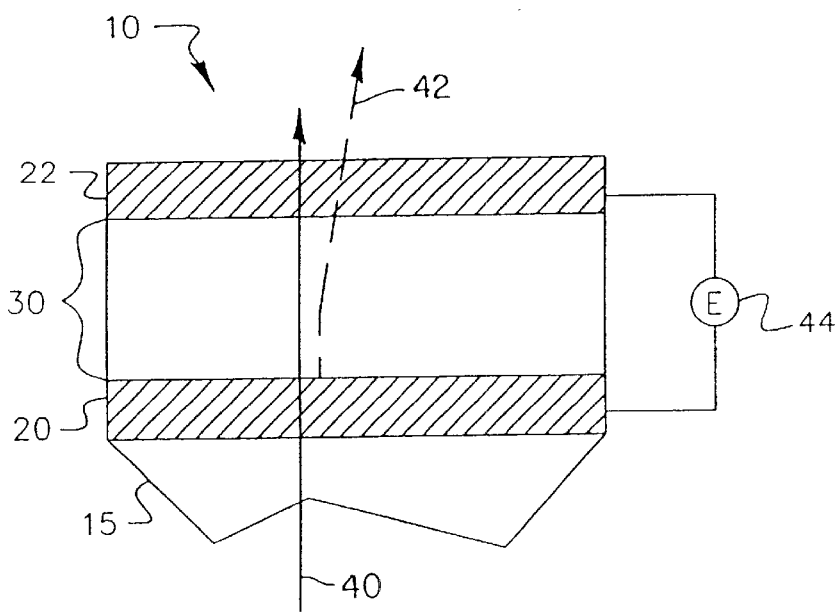
FIG. 1B is a sectional view of the sheet of FIG. 1A with an applied electrical field.

In FIG. 1B, the coated sheets using the conventional dispersion means discussed above were bonded to a second sheet of ITO coated plastic to provide a clear top second conductor 22. An electric field 44 was applied to align the liquid crystal material in light-modulating layer 30. The domains aligned and all sheets became transparent. When electric field 44 was removed, sheets 10 returned to a translucent state. Selective translucence of sheet 10 is useful in making privacy screens and displays, as set forth in the prior art.

Figure 3:
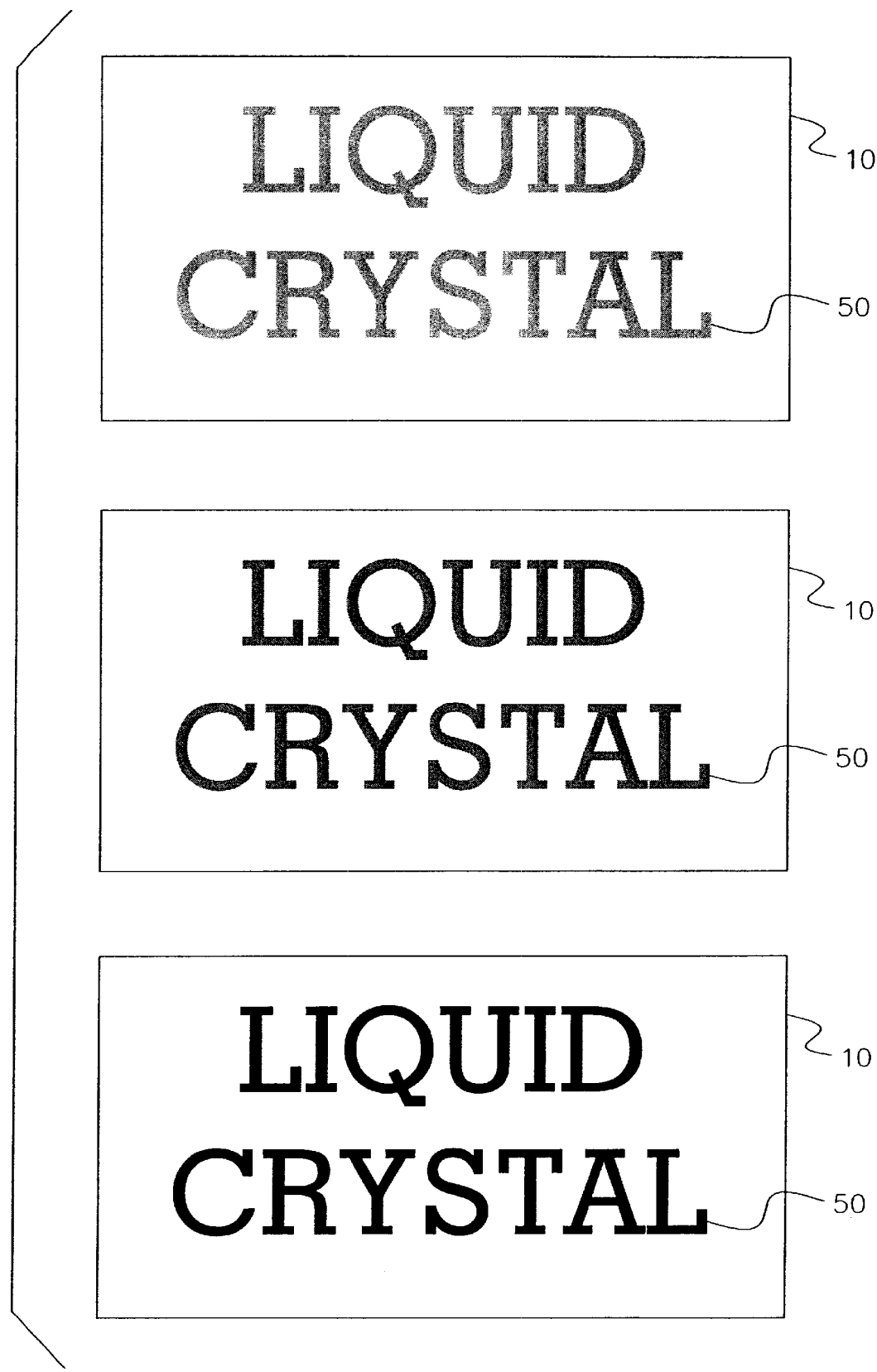
FIG. 3 depicts the visual effects of viewing text through sheets having different degrees of translucence.

The domains of the dried light-modulating material had particle size varying in diameter by a ratio of 10:1. This creates large domains 32 and smaller parasitic domains 34. Parasitic domains 34 created domains have reduced optical characteristics than optimized larger domains 32. In order to compare the effectiveness of the present invention, a series of coatings according to prior art and the current invention were made. Textual information was placed the same distance from coatings according to the present invention and coatings according to the prior art. The translucence of the present invention was greater than the prior art. FIG. 3 demonstrates an image viewed through a high translucence coating at the top, a medium translucence coating in the middle and a low translucence coating at the bottom for a given text 50.

Figure 4:
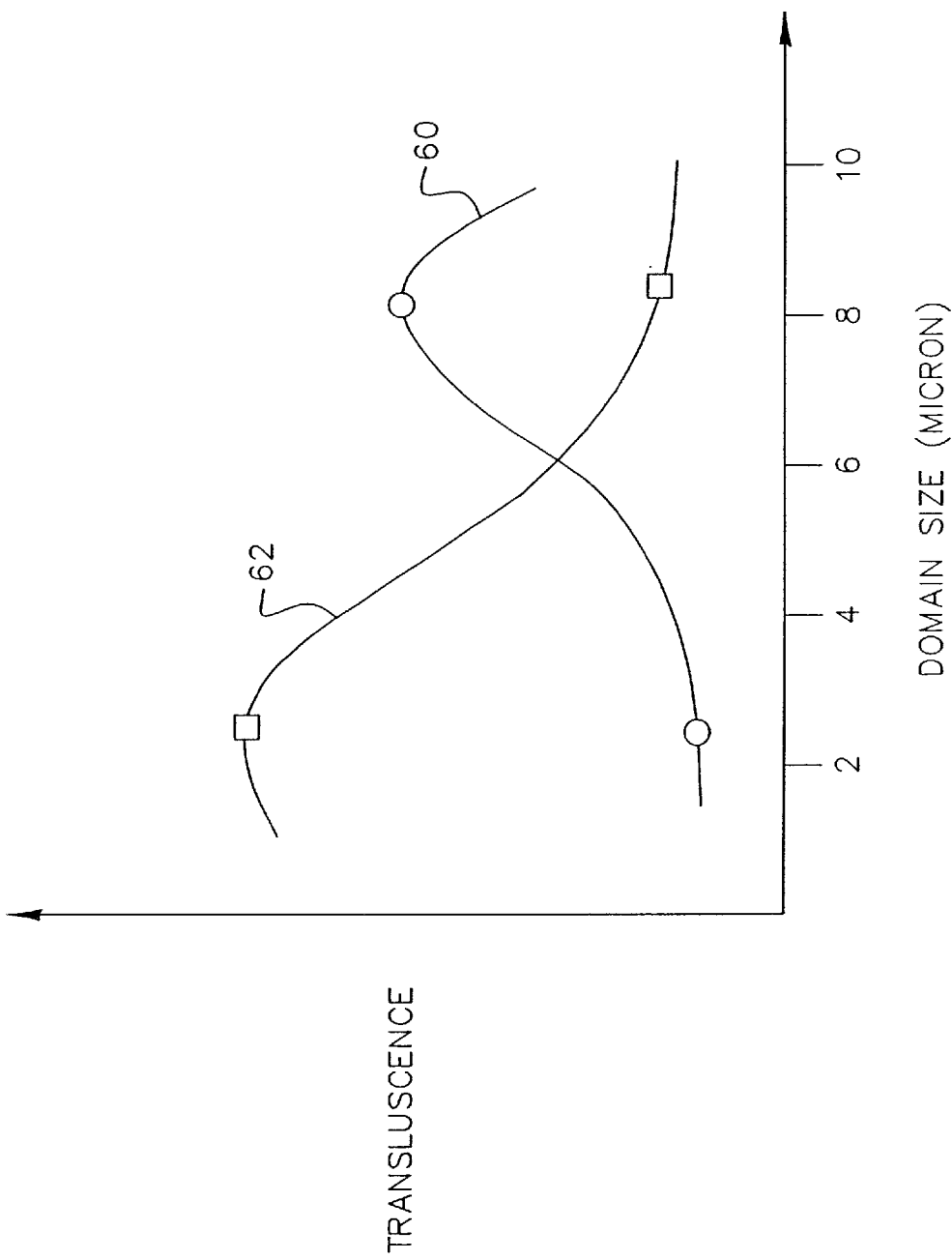
FIG. 4 is a graph of translucence vs. domain size of a nematic materials using conventional and limited coalescence dispersion processes.

FIG. 4 graphs conventional dispersion translucence 60 versus domain size. As domain size increases from 2 to 10 microns in size, the effective translucence of the sheet increases to a maximum value. Below 10 microns, domains have reduced diffusing power. The coatings lose efficiency because parasitic domains 34 are smaller than an optimal mean diameter.

Sheets 10 were fabricated using limited coalescence materials and processing to form uniformly sized emulsions of liquid crystalline material. This was done by homogenizing the liquid crystalline material in the presence of finely divided silica, a coalescence limiting material, (LUDOX® from duPont Corporation). A promoter material was added to the aqueous bath to drive the colloidal particles to the liquid-liquid interface. In the example, a copolymer of adipic acid and 2-(methylamino)ethanol was used as the promoting agent in the water bath. The liquid crystal material was dispersed using ultrasound to create liquid crystal domains below 1 micron in size. When the ultrasound energy was removed, the liquid crystal material coalesced into domains of uniform size. The ratio of smallest to largest domain size varied by approximately 1:2. By varying the amount of silica and copolymer relative to the liquid crystalline material, uniform domain size emulsions of average diameter (by microscopy) approximately 1, 3, and, 8 micron were produced. These emulsions were diluted into gelatin solution for subsequent coating.

Figure 2A:
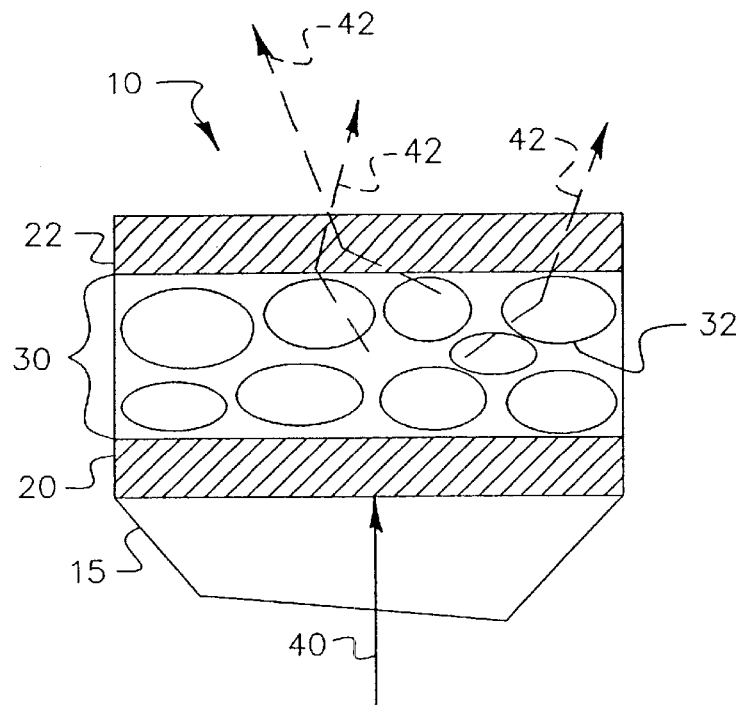
FIG. 2A is a sectional view of a polymer dispersed liquid crystal material using limited coalesence processes in accordance with the present invention.
Figure 2B:
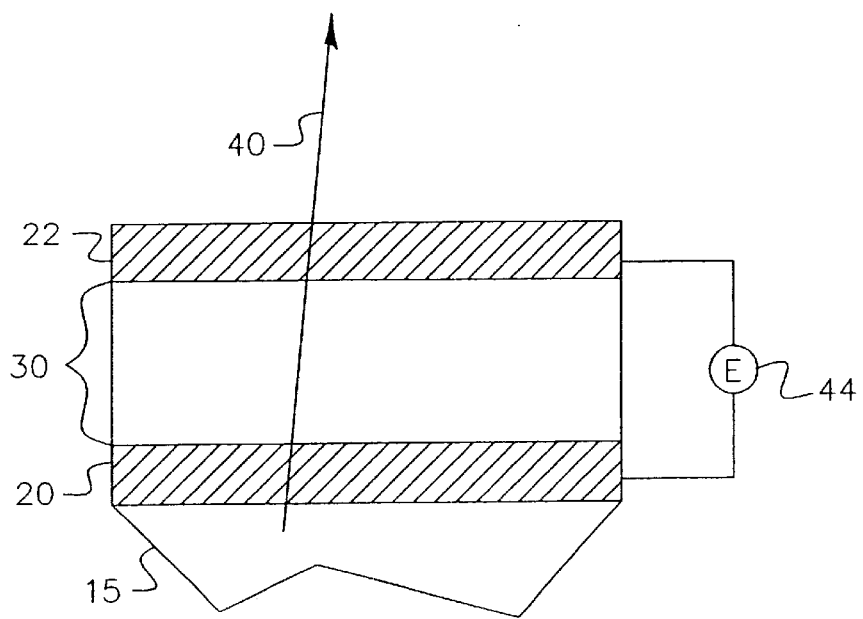
FIG. 2B is a view that shows the material of FIG. 2A with an applied electrical field.

The limited coalescent materials were coated using a photographic emulsion coating machine onto sheets of polyester having an ITO coating with a sheet conductivity of 160 ohms per square. The coating was dried to provide a 9 micron thick polymerically dispersed cholesteric coating. FIG. 2A is a sectional view of sheet 10 showing domains 32 of a limited coalescent material which have maintained their uniform size after the addition of the surfactant and after being machine coated. There were few, if any, parasitic domains 34 (having undesirable electro-optical properties) within the dried coatings. in FIG. 2B, the coated sheets were bonded to a second sheet of ITO coated plastic and electric field 44 applied to align the liquid crystal material in light-modulating layer 30. The domains aligned and all sheets became transparent with a minimum of scattering light 42.

In FIG. 4, conventional dispersion translucence 60 and limited coalescence translucence 62 are plotted against domain size. Coatings made using limited coalescence having a domain size of about 2 microns had the greatest translucence. The translucence of limited coalescence generated materials dropped as domain size increased above 2 microns. For constant material concentrations and coating thickness, limited coalescent materials having a domain size of about 2 microns in size are significantly more translucent than any sized domains formed using conventional dispersion. It has also been proven that limited coalescent dispersions can be machine coated and maintain a uniform domain size.

FIG. 5A and FIG. 5B show two stable states of cholesteric liquid crystals. In FIG. 5A, a high voltage field has been applied and quickly switched to zero potential, which causes cholesteric liquid crystal molecules to go into the planar state 72. In FIG. 5B, application of a lower voltage field has caused molecules of the cholesteric liquid crystal material to break into transparent tilted cells that are known as focal-conic state 74. Increasing the time duration of a low-voltage pulse progressively drives the molecules in a planar state 72 towards a fully evolved and transparent focal-conic state 74.

A light absorber 70 can be positioned on the side opposing the incident light 40. In the fully evolved focal-conic state the cholesteric liquid crystal is transparent, passing incident light 40, which is absorbed by light absorber 70 to create a black image. Progressive evolution of the focal-conic state causes a viewer to perceive a reflected light 46 that transitions to black as the cholesteric material changes from planar state 72 to a focal-conic state 74. The transition to the light transmitting state is progressive, and varying the low voltage time permits variable levels of reflection. These variable levels can be mapped out to corresponding gray levels, and when the field is removed, light-modulating layer 11 maintains a given optical state indefinitely. This process is more fully discussed in U.S. Pat. No. 5,437,811.

FIG. 6 is a cross section through a domain 32 containing a cholesteric material. Domain 32 is spherical, and cholesteric material anchors on he surface of the domain. Because the surface of domain is spherical, incident light 40 from any angle of observation is reflected. The result is that these polymer dispersed (cholesteric) liquid crystals (PDChLC) have good off-axis reflectivity.

In an experiment, E.M Industries chiral nematic liquid crystal material BL-118 was dispersed in deionized photographic gelatin. The BL-118 cholesteric liquid crystal material had a concentration of chiral dopant sufficient to reflect green (550-nanometer) light. The liquid crystal material was dispersed at an 8% concentration in a 5% deionized gelatin solution. The mixture was dispersed using a Silverson mill. Changing the milling time varied the final droplet size. Mixtures were made having a mean domain size of 1, 4 and 9 micron. Using a conventional dispersion process, these domains vary in size by a ratio of 10:1. The materials were coated onto a sheet of ITO coated polyester having a sheet conductivity of 160 ohms per square. The coating was dried to provide a 9-micron thick polymerically dispersed cholesteric coating. The coated materials were effective.

FIG. 7A is a sectional view through the experimental sheets 10 having domains of cholesteric material in deionized gelatin which act as light-modulating layer 30. Light-modulating layer 30 was printed with a black, electrical conductive material to create second conductor 22 which also acts as light absorber 70 for the cholesteric liquid crystal. A high voltage electrical field was applied to align the cholesteric liquid crystal in light-modulating layer 30 to the planar state 72 as shown in FIG. 5A. Cholesteric liquid crystal material in domains 32 aligned and all sheets 10 reflected a green reflective light 46 and some scattered light 42. In FIG. 7B, a low field was applied to sheet 10, converting the liquid crystal to the focal-conical state 74 shown in FIG. 5B. Sheets 10 could be repeatedly changed between the planar and focal-conic states, and maintained a given state in the absence of any electrical field. The selective bimodal optical states seen in sheets 10 are useful in display sheets having memory, as set forth in the prior art.

Figure 9:
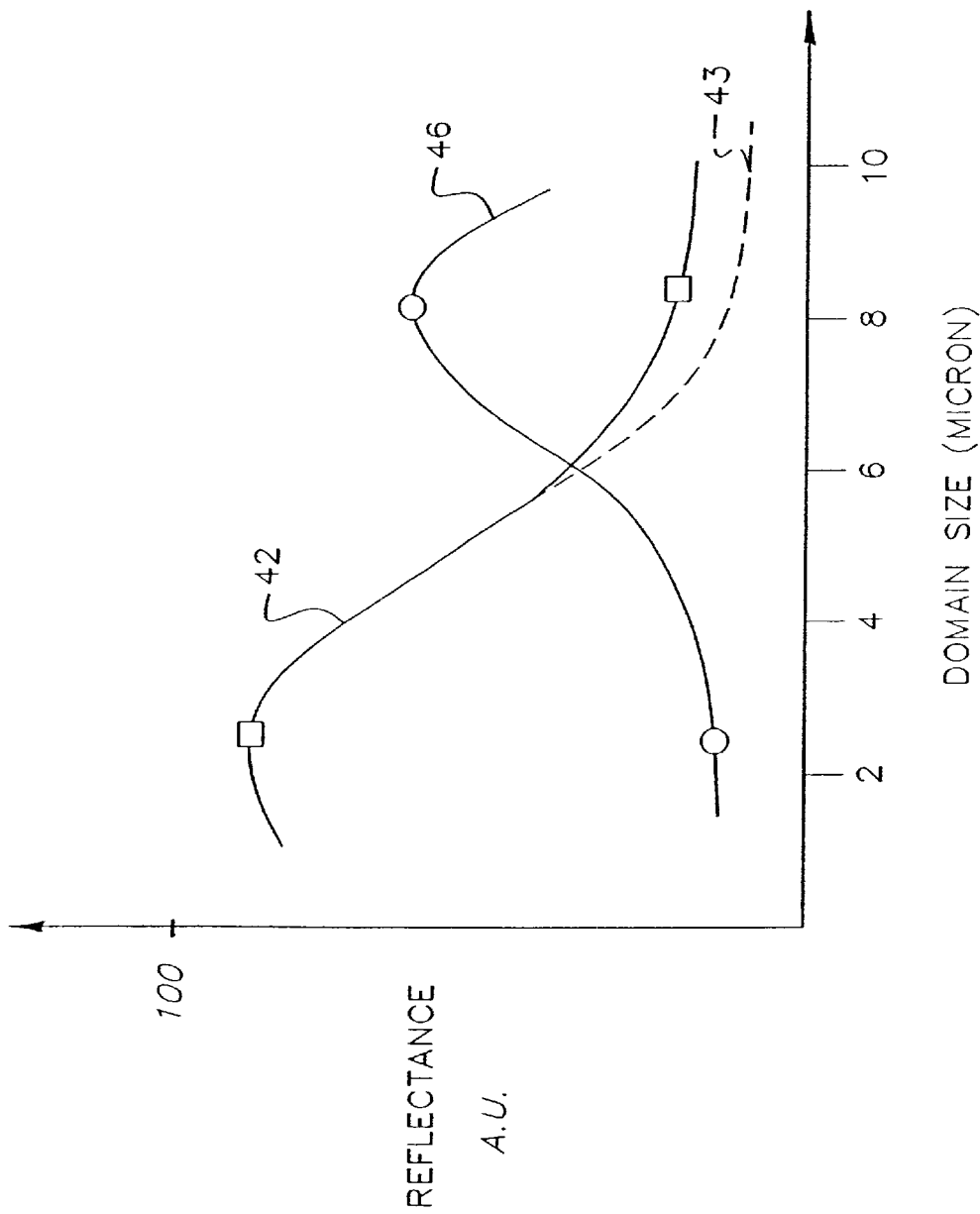
FIG. 9 is a graph of the reflectance vs. domain size of a cholesteric material using conventional and limited coalescence materials.

The dried coating had particle sizes varying in diameter by a ratio of 10:1. This creates large domains 32 and smaller parasitic domains 34. A series of coatings having the same material concentrations and thickness, but different mean domain size, were measured for reflectance. FIG. 9 graphs scattered light 42 and reflected light 46 versus domain size for conventional dispersions. At smaller mean domain sizes, such as 2 micron, domains 32 tend to scatter light 42, and have little reflected light 46. As domain size increases to 10 microns in size, domains 32 increase in reflected light 46 and decrease in scattered light 42. It is apparent that domains below 10 microns act more as diffusers than reflectors. Even with large domain sizes, parasitic domains 34 will act more to diffuse, distorting the purity of color reflection.

A set of sheets 10 was generated using the same limited coalescence process and materials that had been used to form limited coalescent nematic liquid crystal sheets. A series of mixtures was created having the 8% cholesteric liquid crystal and 5% gelatin. Ludox TM colloidal silica, a coalescence limiting material from duPont Corporation was added to the mixture along with and adipate promoter to make the colloid more oleophilic. The mixture was excited by an ultrasound to create sub-micron particles. In accordance with the present invention, it will be appreciated that an aqueous bath with an immiscible, field responsive light-modulating material along with a quantity of colloidal particles, wherein the colloidal particles limit coalesced domain size and a binder, needs to be provided. The mixture or constituents in the bath are blended to form a dispersion of said field-responsive, light-modulating material below a coalescence size which sets to form limited coalescence domains having a uniform size. The blended mixture should be allowed to set for a few minutes, during such time, the liquid crystal domains were formed having a very consistent domain size. A series of experiments was conducted using different concentrations of the Ludox and adipate to create a set of mixtures having 1, 3 and 8 micron domain size.

Limited coalescence is again defined as dispersing a light-modulating material below a given size, and using coalescent limiting material to limit the size of the resulting domains. Such materials are characterized as having a ratio of maximum to minimum domain size of less than 2:1. By use of the term "uniform domains", it is meant that domains are formed having a domain size variation of less than 2:1. Limited domain materials have improved optical properties.

A 0.10% concentration of sodium triisopropylnaphthalene sulfonate was added to the emulsion to permit the mixture to uniformly cover an ITO surface. The limited coalescent materials with the added surfactant were coated using a photographic coating machine onto sheets of polyester having an ITO coating with a sheet conductivity of 160 ohms per square. The coating was dried to provide a 9-micron thick polymerically dispersed cholesteric coating. FIG. 8A is a sectional view through a limited coalescent cholesteric liquid crystal sheet showing that domains 32 maintained their uniform size after the addition of the surfactant and after being machine coated. There were few, if any, parasitic domains 34 within the dried coatings.

The limited coalescent materials were coated with a black, electrical conductive material to create second conductor 22. A high voltage electrical field was applied to align the liquid crystal material in light-modulating layer 30 to goes into the planar state 72 in FIG. 5A. FIG. 8B shows a low field applied to sheet 10 to convert the liquid crystal to the focal-conic state 74 in FIG. 5A. Sheets 10 could be repeatedly changed between the planar and focal-conic states, and maintained a given state in the absence of any electrical field. The selective bimodal optical states seen in sheets 10 are useful in display sheets having memory, as set forth in the prior art.

Figure 10:
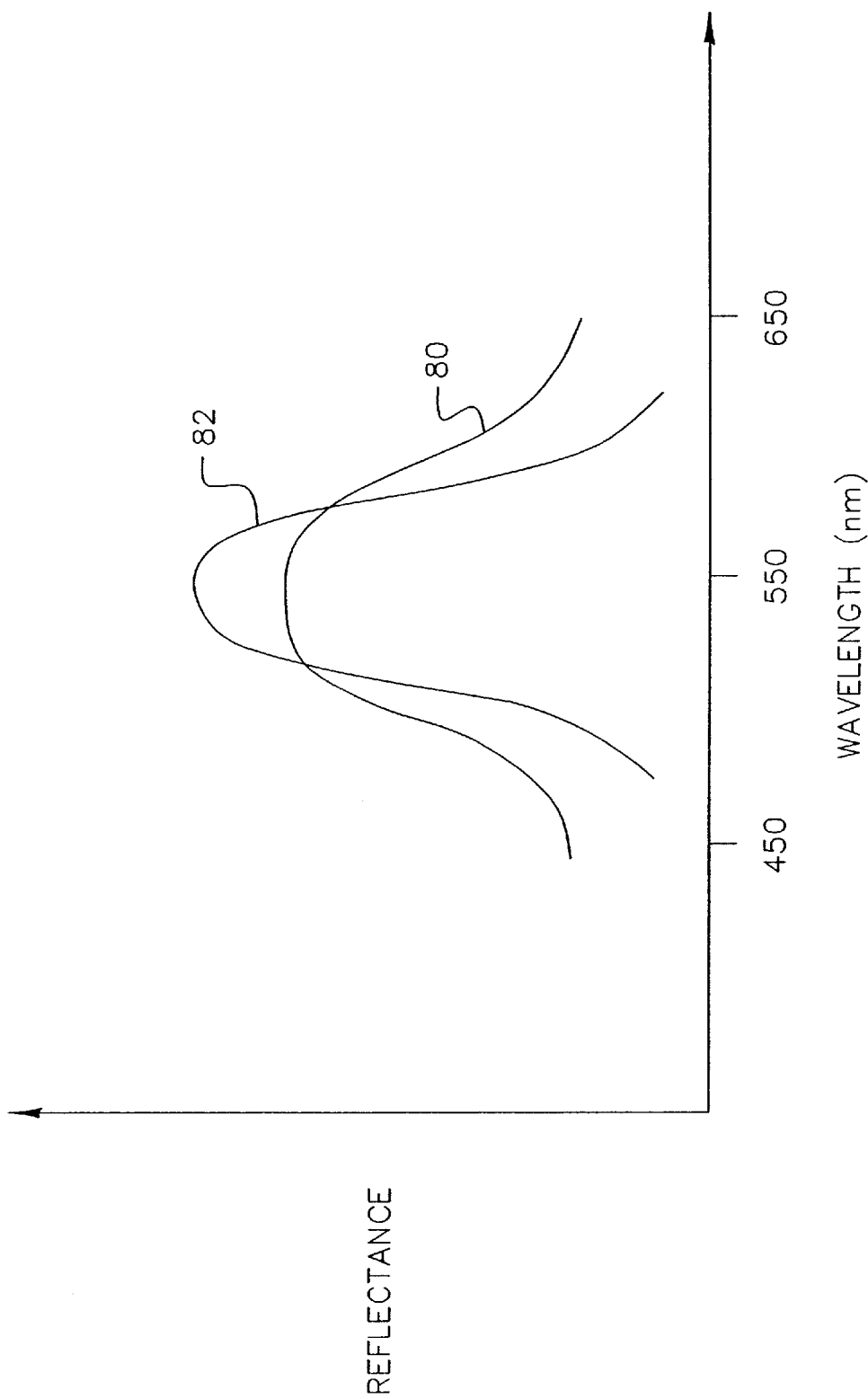
FIG. 10 is the spectral distribution of polymer dispersed cholesteric liquid crystal materials using conventional and limited coalescent dispersion methods.

The sheets made by the limited coalescence process had curves similar to those of conventionally dispersed materials shown in FIG. 9. However, with 8 to 10 micron domains, the material had reduced scattering 43 due to the elimination of parasitic domains 34. FIG. 10 is a plot of the spectral distribution of a cholesteric material using conventional dispersion material 80 and limited coalescent dispersion material 82 with a mean domain size of 10 microns. The conventional dispersion materials reflect light in wavelengths outside the reflectivity cholesteric liquid crystal.

Conventionally dispersed cholesteric materials gave parasitic domains 34, which reflect light in wavelengths outside the wavelengths reflected by the cholesteric material. Limited coalescent dispersions 82 had reduced reflection in other wavelengths due to the elimination of parasitic domains 34. The increased purity of color is important in the development of full color displays requiring well-separated color channels to create a full-color image. Limited coalescent cholesteric materials provide purer light reflectance than cholesteric liquid crystal material dispersed by conventional methods. It was also proven that such materials could be produced using conventional photographic coating machinery.

The invention has been described in detail with particular reference to certain preferred embodiments thereof, but it will be understood that variations and modifications can be effected within the spirit and scope of the invention.

PARTS LIST 10 sheet
15 substrate
20 first conductor
22 second conductor
30 light-modulating layer
34 domains
40 parasitic domains
42 incident light
42 scattered light
43 reduced scattering
44 electric field
46 reflected light
50 text
60 conventional dispersion translucence
62 limited coalescence translucence
70 light absorber
72 planar state
74 focal-conic state
80 conventional dispersion material
82 limited coalescence dispersion material

What is claimed is:

1. A method of making a polymeric dispersed electrically responsive light-modulating material comprising the steps of:

(a) providing in an aqueous bath an immiscible, field responsive light-modulating material along with a quantity of colloidal particles wherein the colloidal particles limit coalesced domain size and a binder;

(b) blending the constituents of the aqueous bath to form a dispersion of said field-responsive, light-modulating material below a coalescence size which sets to form limited coalescence domains having a ratio of maximum to minimum domain size of less than 2:1 and having a uniform size;

(c) coating said material onto a substrate; and (d) drying said coated material to form a set of uniform liquid domains.

2. A method of making a light-modulating, electrically responsive sheet comprising:

(a) providing a substrate;

(b) forming an electrically conductive layer over the substrate;

(c) providing in an aqueous bath an immiscible, field responsive light-modulating material along with a quantity of colloidal particles wherein the colloidal particles limit coalesced domain size and a binder;

(d) blending the constituents of the aqueous bath to form a dispersion of said field-responsive, light-modulating material below a coalescence size which sets to form limited coalescence domains having a uniform size;

(e) coating said material over the substrate; and (f) drying said coated material to form a set of uniform liquid domains so that such dispersion coalesces to form a set of uniform limited coalescence domains having a ratio of maximum to minimum domain size of less than 2:1 and having a plurality of electrically responsive optical states.

3. The method of claim 2 wherein the dispersion includes liquid crystal material.

4. The method of claim 3 wherein the dispersion includes cholesteric liquid crystal material.

5. The method of claim 3 wherein the dispersion includes nematic liquid crystal material.

6. The method of claim 1 wherein the binder is a dissolved polymer.

7. The method of claim 6 wherein the dissolved polymer is gelatin.

8. The method of claim 2 wherein the binder is a dissolved polymer.

9. The method of claim 8 wherein the dissolved polymer is gelatin.

10. The method of claim 1 wherein the colloidal particles are colloidal silica.

11. The method of claim 2 wherein the colloidal particles are colloidal silica.

12. The method of claim 1 wherein the aqueous bath further contains a promoter material to drive the colloidal particles to the liquid-liquid interface.

13. The method of claim 12 wherein the promoter material is a copolymer of adipic acid and 2-(methylamino) ethanol.

14. The method of claim 2 wherein the aqueous bath further contains a promoter material to drive the colloidal particles to the liquid-liquid interface.

15. The method of claim 14 wherein the promoter material is a copolymer of adipic acid and 2-(methylamino) ethanol.

16. A method according to claim 1, wherein domain size is about 2 microns.

17. A method according to claim 2, wherein domain size is about 2 microns.

* * * * *